Jan. 1, 1963 G. J. RUTH 3,071,684
HEADLAMPS
Filed Oct. 21, 1960 2 Sheets-Sheet 1

INVENTOR.
GEORGE JOHN RUTH
BY
Joseph J Martin
ATTORNEY

INVENTOR.
GEORGE JOHN RUTH
BY
ATTORNEY

United States Patent Office 3,071,684
Patented Jan. 1, 1963

3,071,684
HEADLAMPS
George John Ruth, 6934 Calhoun, Dearborn, Mich.
Filed Oct. 21, 1960, Ser. No. 64,162
1 Claim. (Cl. 240—46.03)

This invention relates to lighting equipment generally, and more particularly to a head lamp for motor vehicles.

Designers and engineers in the automotive industry have almost universally adopted permanently sealed multi-filament head lamps as a standard item of equipment for vehicular lighting. It is therefore necessary to replace the entire lighting unit in the event a single filament becomes either defective or damaged. As this type of head lamp is relatively expensive, and not generally available in service stations and repair garages, their replacement is both a costly and time consuming operation.

Cognizant of this situation, the applicant has, as the primary object of this invention, the provision of a head lamp for motor vehicles which has a plurality of relatively inexpensive single filament bulbs.

Another object of the invention is to provide head lamps of the type previously described in which the individual bulbs function independently of each other, and are conveniently accessible.

A further object of the invention is the provision of a head lamp of the type previously described which will extend across substantially the entire width of the vehicle.

Yet another object of the invention is to provide a head lamp of the type previously described, which has a retractile shield to protect the lamp from damage by rocks and gravel during daytime driving.

Additional features and advantages of the invention will become apparent after thorough consideration of a detailed description and discussion of the same composed with reference to the accompanying drawings, constituting a portion of this application, and in which.

Figure 1:
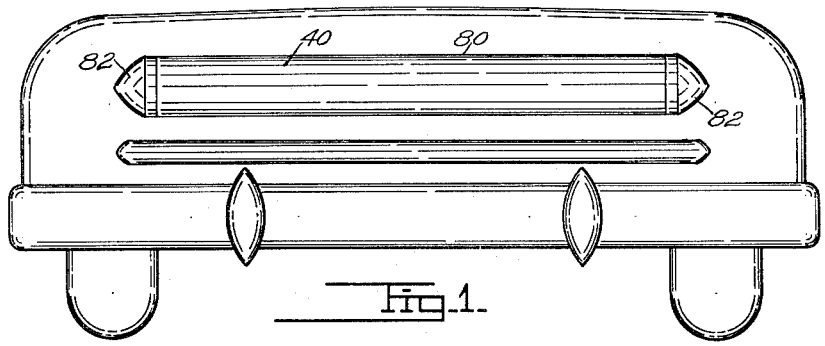
FIGURE 1 is an elevation view disclosing the applicant's head lamp mounted on the front end of a motor vehicle, showing the protective shield covering the light transmitting cover.

For a more detailed description of the invention, reference is made to the drawings in which numeral 10 designates a mounting bracket having a lateral member 12 with two spaced upright supports 14 and 16. A tubular casing 18, with a circular hub 20 on each end thereof, is detachably mounted between the two upright supports 14 and 16. A rectangular opening 22 is provided in the tubular casing 18, with a light transmitting cover 24 thereover, removably attached by spaced screws 26.

A sealing gasket 28 is applied around the rectangular opening 22 between the light transmitting cover 24 and the tubular casing 18. A longitudinal partition 30 divides the tubular casing 18 into two reflectorized compartments 32 and 34 disposed behind the rectangular opening 22. A plurality of single filament light bulbs 36 are detachably mounted in each of the reflectorized compartments 32 and 34. The light bulbs 36, in each of the reflectorized compartments 32 and 34, are electrically connected in parallel by two conductors 36 and 37 respectively.

An access opening 38 is provided in the rear of the tubular casing 18. A curved protective shield 40 for the light transmitting cover 24 is slidably retained at each end in an annular groove 42 provided in the circular hubs 20. An arcuate track 44, having therein a series of slots 46, is mounted transversely on the protective shield 40. A drive gear 48 is fixed on a shaft 50 rotatably supported in a vertically disposed member 52 on the mounting bracket 10. Spaced teeth 54 on the drive gear 48 are in register with the slots 46 in the arcuate track 44.

Figure 8:
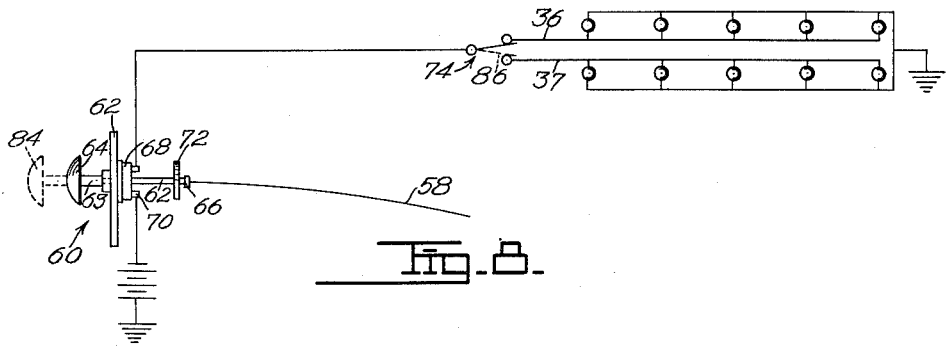
FIGURE 8 is an elevation view showing the control switch, and the manner of connecting it to a foot selector switch and the electrical elements in the applicant's head lamp.

A drive disc 56 is fixedly mounted on the shaft 50, and provided with an actuator rod 58 for connection to a control switch 60. The control switch 60 is mounted in the instrument panel 62 of a motor vehicle as illustrated in FIGURE 8 of the drawings. The control switch 60 has a central plunger 63 with a gripping knob 64 on the outer end thereof, and a connector 66 on the inner end attached to the actuator rod 58. The control switch 60 has an insulated block 68 thereon with two spaced terminals 70.

A contactor 72 is mounted on the central plunger 63 of the control switch 60, adjacent the connector 66. The control switch 60 is connected into the electrical system of a motor vehicle, not here shown, by attaching one of the terminals 70 to a source of electrical potential, and the other terminal 70 to a foot selector switch 74. The light bulbs 36 in the upper and lower compartments in the tubular casing 18, 32 and 34 respectively, are connected to the foot selector switch 74 by means of the two conductors 36 and 37.

In practice, it is necessary to design the grill of a motor vehicle so as to provide an opening therein suitable for reception of the applicant's head lamp. The grill shown in FIGURE 1 has been provided with a rectangular opening 80, at each end of which is a tapered convex projection 82. In applying the applicant's head lamp to the vehicle in FIGURE 1, the entire assembly of FIGURE 2 is inserted behind the grill, and located so that the tubular casing 18 extends through the rectangular opening 80.

In this position, the circular hubs 20 on the tubular casing 18 are received in the tapered convex projections 82 on the grill. The mounting bracket 10 is then welded or otherwise suitably secured to the vehicle frame, so as to hold the head lamp in its assigned position in the grill. The previous discussion completes a detailed description of the structure characterizing the applicant's invention; however, to provide a more thorough understanding of the subject matter herein presented, a brief discussion will be directed to the manner in which the applicant's head lamp operates in performing its intended function.

Figure 2:
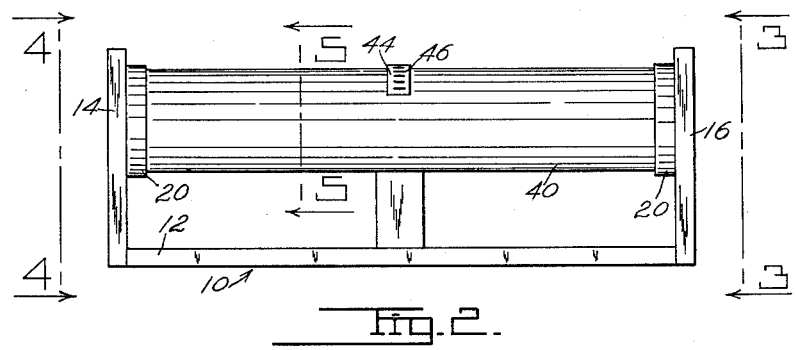
FIGURE 2 is a front elevation view disclosing the applicant's head lamp detached from the motor vehicle, showing the mounting bracket and a portion of the arcuate track on the protective shield.

In use, the protective shield 40 assumes the position shown in FIGURES 1 and 2, over the light transmitting cover 24 when the head lamp is not in operation. When it is desired to light the head lamp, the control switch 60 is pulled to the broken line position 84 in FIGURE 8, whereupon the contactor 72 is placed across the two terminals 70, thereby completing the electric circuit to the foot switch 74.

Figure 4:
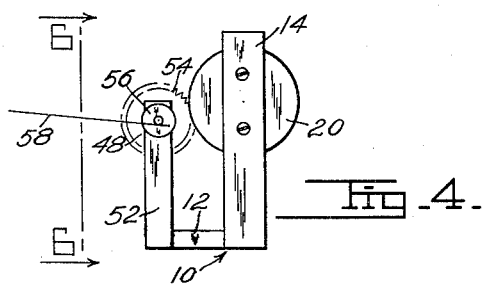
FIGURE 4 is an elevation view taken substantially on plane 4—4 in FIGURE 2, showing the drive disc mounted on the shaft of the drive gear.
Figure 3:
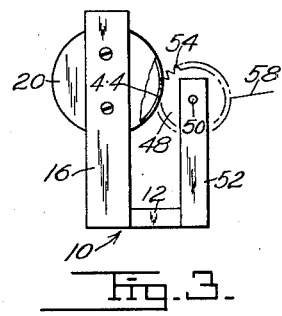
FIGURE 3 is an elevation view taken substantially on plane 3—3 in FIGURE 2, with a section of the end hub broken away so as to show the arcuate track on the protective shield.
Figure 5:
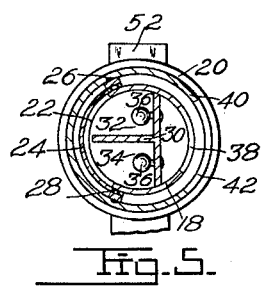
FIGURE 5 is an enlarged section view taken substantially on plane 5—5 in FIGURE 2 showing the interior of the tubular casing.
Figure 6:
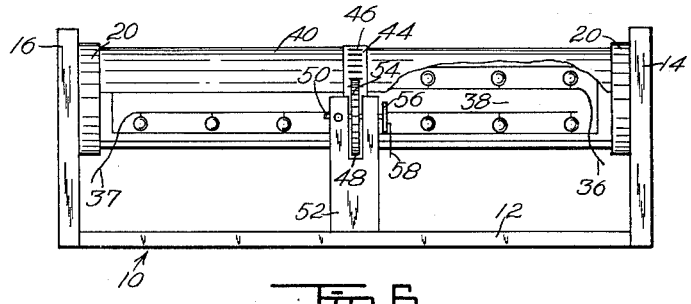
FIGURE 6 is an elevation view taken substantially on plane 6—6 in FIGURE 4, with a section of the protective shield broken away, showing the manner in which the electrical elements are connected.
Figure 7:
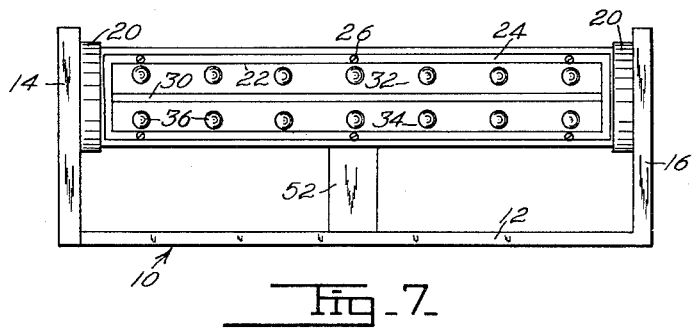
FIGURE 7 is an elevation view of the applicant's lamp, similar to that of FIGURE 2, with the protective shield removed from the tubular casing so as to show disposition of the electrical elements within the casing.

When the foot switch 74 is placed in the broken line position 86 shown in FIGURE 8, the light bulbs 36 in the lower reflectorized compartment 34 are energized. As the control switch 60 is moving to the broken line position 84, it exerts a pull on the actuator rod 58, which rotates the drive disc 56 in a clockwise direction as viewed in FIGURE 4. This rotation of the drive disc 56 produces a similar movement of the drive gear 48, which causes the arcuate track 44 to be driven in a counter-clockwise direction, thus sliding the protective shield 40 from the light transmitting cover 24.

When the foot switch 74 is placed in the full line position shown in FIGURE 8, light from the upper reflectorized compartment 32 provides projected illumination suitable for country driving. When it is desired to direct the light downward for city driving, the foot switch 74 is shifted to the broken line position 86 in FIGURE 8. In this position, the light bulbs 36 in the lower reflectorized compartment 34 are energized. When the head lamp is no longer needed, the control switch 60 is moved to the full line position shown in FIGURE 8, whereupon the electric circuit to the foot switch 74 is interrupted, and simultaneously therewith, the protective shield 40 is again moved over the light transmitting cover 24.

Based upon the foregoing discussion, the applicant is of the opinion that his invention has fulfilled a long-felt need in the field of vehicular lighting, and that he has accordingly made a valuable contribution to the related art. However, while the invention was described with reference to the structural details of a single embodiment, it will be appreciated by those skilled in the art, that the principles involved are susceptible of numerous other practical applications.

Therefore, I claim as new, and desire to secure by Letters Patent:

In a head lamp, a mounting bracket, a casing having therein an elongated opening, supported at each end by the mounting bracket, a plurality of reflectorized compartments in the casing, electrical elements in each of the reflectorized compartments, switch means controlling the electrical elements, a detachable light transmitting cover over the elongated opening in the casing, a protective shield over the light transmitting cover slidably supported at each end by the mounting bracket, spaced slots on the protective shield, a drive gear rotatably supported by the mounting bracket in mesh with the slots on the protective shield, and means for operating the drive gear controlled by the switch means.

References Cited in the file of this patent

UNITED STATES PATENTS

| | | |
|---|---|---|
| 1,517,137 | Whipple | Nov. 25, 1924 |
| 1,672,282 | Purchio | June 5, 1928 |
| 2,113,981 | Cunningham | Apr. 12, 1938 |
| 2,278,028 | Thoen | Mar. 31, 1942 |
| 2,329,684 | Ashley | Sept. 21, 1943 |
| 2,451,157 | Dike | Oct. 12, 1948 |
| 2,921,180 | Stiglin | Jan. 12, 1960 |
| 2,940,064 | Wilfert | June 7, 1960 |